US008565186B2

(12) United States Patent
Dutta et al.

(10) Patent No.: US 8,565,186 B2
(45) Date of Patent: Oct. 22, 2013

(54) METHODS OF MITIGATION OF TROMBONE ROUTING IN AN IMS/MMD NETWORK

(75) Inventors: Ashutosh Dutta, Bridgewater, NJ (US); Abhrajit Ghosh, Edison, NJ (US); John Lee, Howell, NJ (US); Subir Das, South Brunswick, NJ (US); Joe Lin, Morris Plains, NJ (US); Kyriakos Manousakis, New Brunswick, NJ (US); Tsunehiko Chiba, Saitama (JP); Hidetoshi Yokota, Minuma (JP); Akira Idoue, Toda (JP)

(73) Assignees: Telcordia Technologies, Inc., Piscataway, NJ (US); KDDI Corporation, Tokyo (JP)

( * ) Notice: Subject to any disclaimer, the term of this patent is extended or adjusted under 35 U.S.C. 154(b) by 658 days.

(21) Appl. No.: 11/898,000

(22) Filed: Aug. 31, 2007

(65) Prior Publication Data
US 2008/0070573 A1  Mar. 20, 2008

Related U.S. Application Data

(60) Provisional application No. 60/841,784, filed on Aug. 31, 2006, provisional application No. 60/844,955, filed on Sep. 15, 2006.

(51) Int. Cl.
*H04W 4/00* (2009.01)

(52) U.S. Cl.
USPC ........... 370/331; 370/328; 370/329; 370/338; 455/435.1; 455/422.1

(58) Field of Classification Search
USPC ............... 370/331, 328, 338; 455/432.1, 432, 455/432.2, 435.1, 435, 410, 425, 560, 552
See application file for complete search history.

(56) References Cited

U.S. PATENT DOCUMENTS

| | | | |
|---|---|---|---|
| 7,058,059 B1* | 6/2006 | Henry et al. | 370/395.1 |
| 2002/0161905 A1* | 10/2002 | Haverinen et al. | 709/229 |
| 2004/0105420 A1* | 6/2004 | Takeda et al. | 370/349 |
| 2004/0203824 A1* | 10/2004 | Mock et al. | 455/452.1 |
| 2004/0246939 A1* | 12/2004 | Koskiahde et al. | 370/351 |
| 2004/0252653 A1* | 12/2004 | Shimizu et al. | 370/310 |
| 2005/0113070 A1* | 5/2005 | Okabe | 455/411 |
| 2005/0195766 A1* | 9/2005 | Nasielski et al. | 370/331 |
| 2005/0226254 A1* | 10/2005 | Vimpari | 370/395.52 |
| 2007/0234404 A1* | 10/2007 | Bogdanovic et al. | 726/3 |

OTHER PUBLICATIONS

S. Kent, R. Atkinson, "Security Architecture for the Internet Protocol", IETF RFC, Nov. 1998, pp. 1-59.
G. Montenegro, "Reverse Tunneling for Mobile IP", IETF RFC 3024, Jan. 2001, pp. 1-27.

(Continued)

*Primary Examiner* — Anez Ebrahim
(74) *Attorney, Agent, or Firm* — Philip J. Feig

(57) ABSTRACT

The present invention advantageously provides several systems and methods for solving the trombone routing issues within an IMS/MMD network. These approaches avoid trombone routing, speed up handoff, and increase the efficiency of signaling and overall performance of an IMS/MMD network. These solutions can broadly be divided into the following categories. Piggy-backing SIP registration over MIP (Split at FA); Selective Reverse Tunneling and Tunneling between FA and P-CSCF; the SIP-based mobility protocol; use of CoA during SIP registration and call up in MIPv6; Piggy-backing SIP registration when HA and S-CSCF Co-exist; Using Dynamic Home Agents in MIPv4 FA-CoA; and the Interceptor-Caching Approach.

3 Claims, 16 Drawing Sheets

(56) References Cited

OTHER PUBLICATIONS

S. Thomson, T. Narten, "IPv6 Stateless Address Autoconfiguration" IETF RFC 2462, Dec. 1998, pp. 1-23.

"IMS Security Framework" 3GPP2 S.S086-B, Version 1.0, Dec. 2005, pp. 1-35.

"Wireless IP Architecture Based on IETF Protocols" 3GPP2 P.R0001 Version 1.0, Jul. 2000, pp. 1-51.

T. Chiba, H. Yokota, A. Idoue, A. Dutta, K. Manousakis, S. Das, H. Schulzrinne, "Trombone Routing Mitigation Techniques for IMS/MMD Networks", IEEE WCNC 2007, Hong Kong, Mar. 11-15, 2007.

A. Dutta, K. Manousakis, S. Das, F. Lin, T. Chiba, H. Yokota, A. Idoue, H. Schulzrinne, "Mobility Testbed for 3GPP2-Based Multimedia Domain Networks" IEEE Communications Magazine, Jul. 2007, pp. 118-126.

E. Wedlund, H. Schulzrinne, "Mobility Support Using SIP", ACM/IEEE WoWMOM Conference, 1999, pp. 76-82.

P. Kim, M. Lee, S. Park, Y. Kim, "A New Mechanism for SIP Over Mobile IPv6" ICCSA, 2004, Perugia, Italy, May 14-17, 2004, pp. 975-984.

* cited by examiner

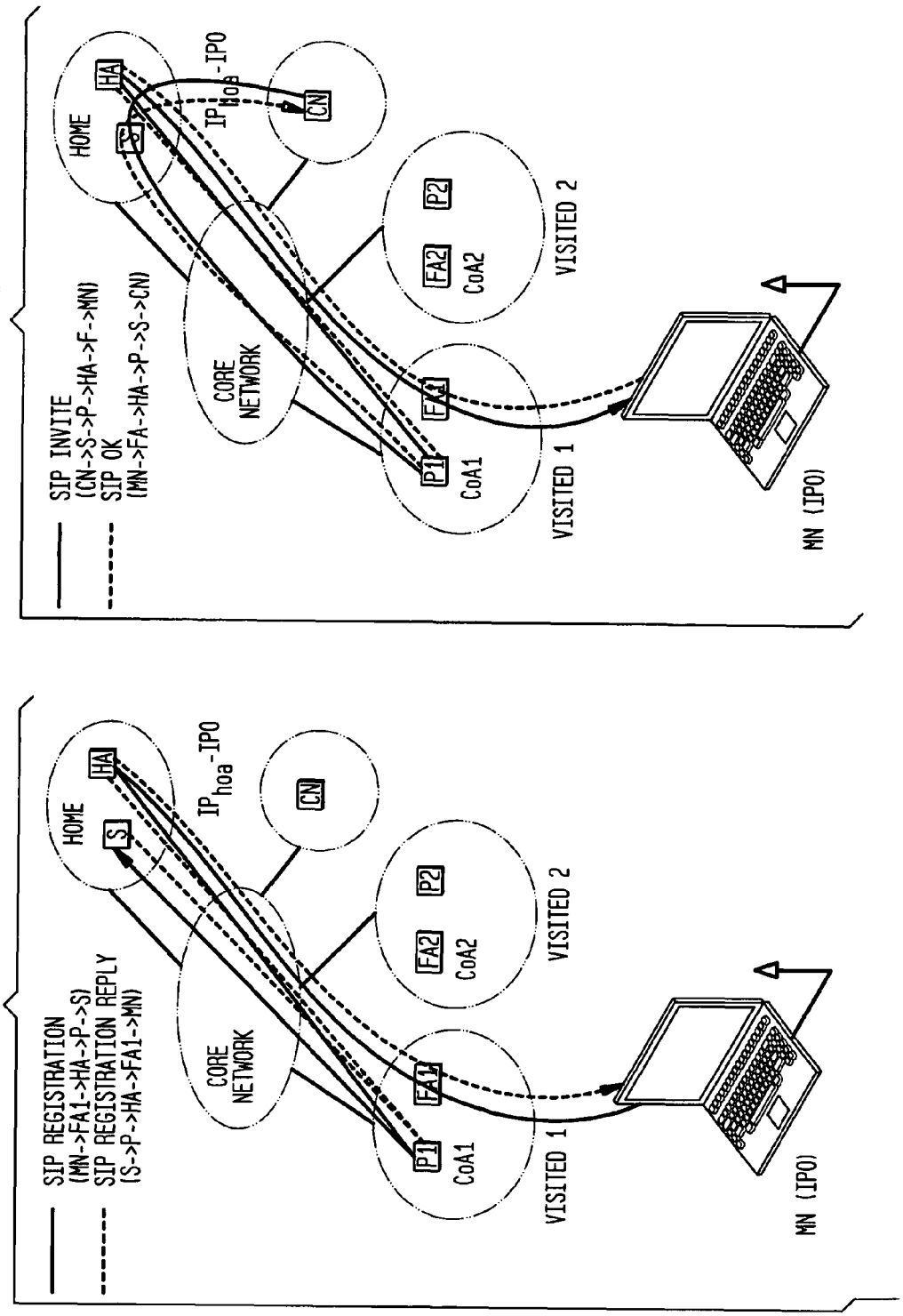

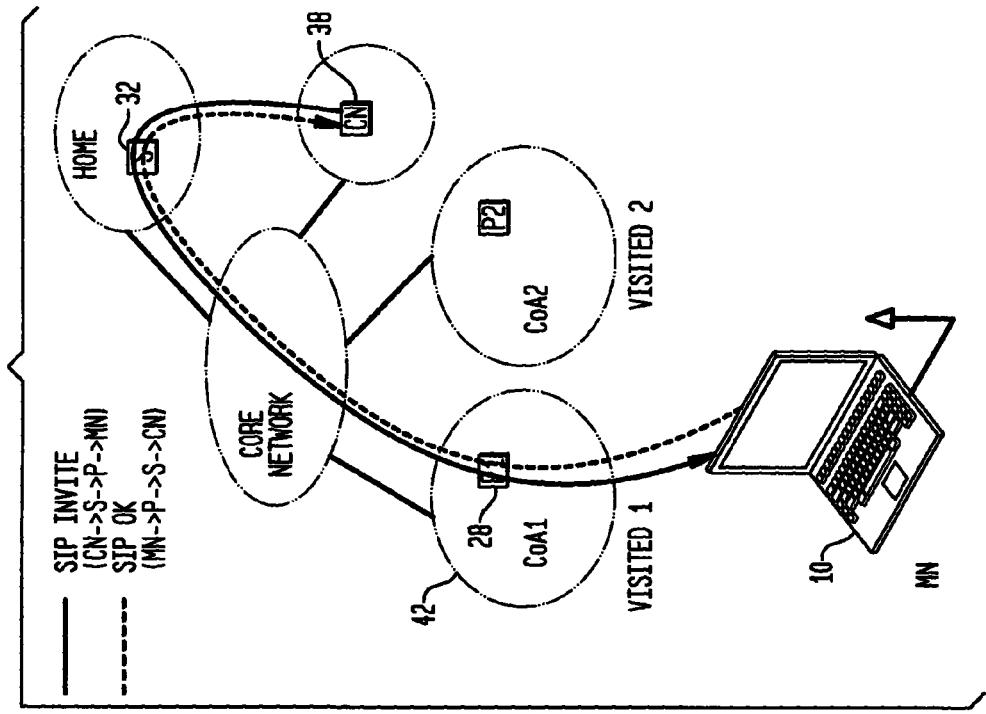
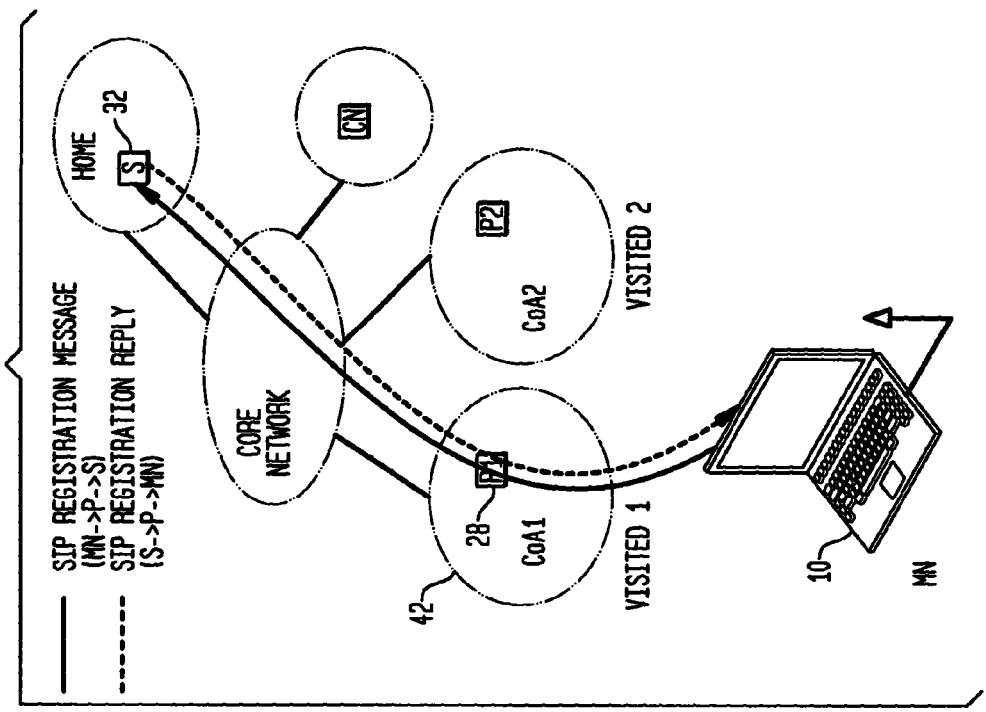

METHODS OF MITIGATION OF TROMBONE ROUTING IN AN IMS/MMD NETWORK

CROSS-REFERENCE TO RELATED APPLICATION

The present invention claims the benefit of U.S. provisional patent application 60/841,784 filed Aug. 31, 2006, and of U.S. provisional patent application 60/844,955 filed Sep. 15, 2006, the entire contents and disclosures of which are incorporated herein by reference.

FIELD OF THE INVENTION

The present invention relates generally to IMS/MMD architecture, and more specifically to mitigation techniques for trombone routing encountered in IMS/MMD networks.

BACKGROUND OF THE INVENTION

An IMS/MMD (IP Multimedia Subsystem/Multimedia Domain) network or architecture primarily comprises several signaling entities such as proxy-call session control function (P-CSCF), interrogating-CSCF (I-CSCF), serving-CSCF (S-CSCF), and home subscriber service (HSS) which is usually a database or other repository for user or subscriber information such as authorization data, including information related to services provided to a user. Roaming service and mobility are supported by a combination of Session Initiation Protocol (SIP) components such as the signaling entities, P-CSCF, S-CSCF, I-CSCF, and mobile IP components or nodes, such as home agent (HA) and foreign agent (FA). IMS/MMD architecture mandates that there should be security association (SA) between the mobile and P-CSCF. Secure Internet Protocol (IPSec) is one way of providing SA for signaling and media traffic.

In IMS, authentication of a user, or user's equipment (UE), can be achieved using authentication and key agreement (AKA). Authentication is achieved between the UE, generally a mobile, and its home network even though the SIP messaging is transported over the Serving, or visiting, network. This allows home network-based control of access to IMS resources, while the visited network controls bearer resources over the packet data servicing nodes (PDSN). SIP Registration and Response messages are used to transport the IMS/AKA protocol payloads. These messages are sent from the UE to the S-CSCF and vice versa. The S-CSCF queries the HSS to obtain security related parameters for the UE. IMS AKA uses a challenge response mechanism to authenticate the UE to the Home Network. The UE uses a long term key to compute a response to a challenge sent by the S-CSCF via the P-CSCF. The P-CSCF plays no role in challenge generation aside from acting as a forwarding element.

In an IMS/MMD network, the signaling and media travel to their destination, such as to S-CSCF, via the HA which usually resides on the home network. This long route or path from a Mobile Node or correspondent node (CN) to a destination through the home network is a phenomenon called trombone routing. Because trombone routing impacts both registration and call setup methods, trombone routing hinders efficiency during a mobile's boot-strapping (registration, re-registration, call setup) in the visited network and during its movement from one subnet to another. This causes both an initial call setup delay, and a handoff delay when the mobile moves from one visited subnet to another. In addition, during a mobile's movement between subnets, AKA is performed as part of registration; hence, a faster registration will help establish an expedited SA, thus reducing the handoff delay.

FIG. 1 shows an example of the inefficiency associated with the trombone routing in the Mobile IPv4 (MIPv4) foreign agent-care-of address (FA-CoA) case. Here, even if the P-CSCF is situated in the same visited network as the mobile node (MN), the signaling related to registration has to traverse all the way to HA in the home network before getting routed to P-CSCF. This inefficiency is partly due to the reverse tunneling associated with the FA-CoA case. Similarly, any incoming call or INVITE signaling message from a CN traverses, via P-CSCF, to HA in the home network before being delivered to the Mobile Node in the visited network. This traversal increases the call setup delay. Since registration is delayed due to trombone routing, the handoff is also delayed as the mobile moves to a new network and sets up a new SA.

Hence, as shown in FIG. 1a), the path of a SIP registration message with trombone routing in MIPv4 FA-CoA is:
MN→FA1→HA→P-CSCF→S-CSCF
and the path of a SIP registration Reply message is:
S-CSCF→P-CSCF→HA→FA1→MN.
Similarly, the path of a SIP INVITE, as shown in FIG. 1b), is:
CN→S-CSCF→P-CSCF→HA→FA1→MN
and the path of a SIP OK is:
MN→FA1→HA→P-CSCF→S-CSCF→CN FIG. 2 shows trombone routing in the Mobile IPv6 (MIPv6) case, and illustrates how trombone routing affects the efficiency when MIPv6 is used. Unlike the MIPv4 case, MIPv6 does not use FA. While using MIPv6, it is customary to use the Mobile Node's home address in the contact field during the Session Initiation Protocol (SIP) registration and re-registration process even if Mobile Node obtains a new CoA from the access router during each handoff. Thus, during the re-registration process, a new P-CSCF's address is provided to the HSS, while the contact address of the Mobile Node remains same. HA, of course, keeps a mapping of Mobile Node's home address and its most recent CoA by means of MIP registration.

Since there is no FA in the visited network in MIPv6, the mobile obtains the new CoA using stateless auto-configuration. When a mobile registers with S-CSCF in the home network, the mobile provides its home address as its contact address. Since there is a reverse tunneling between the mobile and HA, both the call setup and registration (re-registration) process are subjected to trombone routing.

As shown in FIG. 2a), the path of a SIP registration message with trombone routing in MIPv6 is:
MN→HA→P-CSCF→S-CSCF
and the path of a SIP registration Reply message is:
S-CSCF→P-CSCF→HA→MN.
Similarly, the path of a SIP INVITE, as shown in FIG. 2b), is:
CN→S-CSCF→P-CSCF→HA→MN
and the path of a SIP OK is:
MN→HA→P-CSCF→S-CSCF→CN
Thus, just like the case of MIPv4, the trombone routing will affect the performance. As is evident from both of these cases, trombone routing is undesirable.

Similarly, there is an inherent trombone routing problem with data or media, because the reverse tunneling is used by default. FIG. 3 shows trombone routing associated with media delivery for both the MIPv6 without route optimization, and the MIPv4 FA CoA-based approach. In MIPv4, MIP data is tunneled between Visited 1 and Home, and then the data travels, non-tunneled, from Home to CN. In MIPv6, the data travels from MN, in Visited 1, to CN in Visited 2, through HA, Home, so that the data passes through the home network when traveling from visited Network 1 to visited Network 2. Although reverse tunneling can offer advantages, this trombone routing contributes to the handoff delay because it necessitates traversing a long path via the home network.

FIG. 4 illustrates another affect of trombone routing in MIPv4. When an IMS mobile node, MN, moves from network A to network B as shown in FIG. 4, the MIP registration and SIP re-registration must be completed at network B as follows. First, Mobile Node detects its mobility through the FA advertisement from the FA at network B. Once Mobile Node detects the mobility, it invokes a MIP registration through the FA and dynamic host configuration protocol (DHCP)-client operation to get the internet protocol (IP) address of the new P-CSCF at network B. At this point, the routing table of the Mobile Node has been updated through the MIP operation, and the tunnel between the FA and HA has been established, so that the Mobile Node can be reachable from any node in the network. After getting the IP address of the P-CSCF from the DHCP server at network B, the Mobile Node invokes a SIP re-registration by sending a SIP registration message to the new P-CSCF. The P-CSCF forwards the SIP message to the S-CSCF that, in turn, replies back to the P-CSCF with a SIP response message. Accordingly, the Mobile Node receives the SIP response message and the SIP re-registration is completed.

In this handoff process, there are two issues. The first is slow handoff. As shown schematically in FIG. 5, the sequential operations of FA advertisement detection, MIP registration, DHCP, and SIP registration increase the handoff delay.

The second issue is inefficient routing. Because of the reverse mode of tunneling between the FA and HA, the SIP messages between the Mobile Node and P-CSCF take the trombone routing path. Hence, as shown in FIG. 6, the path of a SIP message from the Mobile Node to the P-CSCF is:

MN→FA→Gateway in Network B→Gateway in Home Network→HA→Gateway in Home Network→Gateway in Network B→P-CSCF A SIP message from the P-CSCF to the Mobile Node takes the reverse path.

Thus, trombone routing causes inefficiencies and delays in both registration and handoff.

The following abbreviations are used throughout.
AAA: authentication, authorization and accounting
AKA: authentication and key agreement
BSC: base station controller
BTS: base transceiver station
CDMA: code division multiple access
CN: correspondent node
CoA: care-of Address
DHA: dynamic home agent (aka mobility agent MA)
DHCP: dynamic host configuration protocol
DNS: domain name service
ESP: encapsulating security payload
FA: foreign agent
HA: home agent
HAA: Home-Agent-MIP-Answer
HAR: Home-Agent-MIP-Request
HHA: handover answer
HHR: handover request
HSS: home subscriber service
IMS: IP Multimedia Subsystem
IMS/MMD—combination of IMS and MMD
IPSec: suite of security protocols
MAC: message authentication code
MIPv4—Mobile IPv4

MIPv6—Mobile IPv6
MMD—Multimedia Domain
MN: mobile node
MPA: media independent pre-authentication
NAI: Network Access Identifier
PCF: packet control function
P-CSCF—Proxy Call Session Control Function
PDSN—Packet Data Serving Node
PPP: point to point protocol
RAN: radio access network
RTP: real-time transport protocol
SA: security association
S-CSCF—Serving Call Session Control Function
SIP: session initiation protocol
SRTP: secure real-time transport protocol
UE: user equipment
URI: Universal Resource Identifier

BRIEF SUMMARY OF THE INVENTION

The present invention advantageously provides systems and methods for solving the trombone routing issues within an IMS/MMD network. These methods avoid trombone routing and increase the efficiency of signaling and overall performance of an IMS/MMD network.

In one embodiment, a system and method for mitigating trombone routing in a MIPv4 FA-CoA network is presented in which the SIP registration message is attached to an MIP control message. The MIP control message, along with the attached SIP registration message, is transmitted to an application-specific relaying node that performs both MIP registration and SIP registration. In particular, the application-specific relaying node sends the SIP registration to the S-CSCF while simulaneously sending the MIP registration to the HA.

In another embodiment, a system and method for mitigating trombone routing in a MIPv4 FA-CoA network using both tunneling and selective reverse tunneling is presented. In this approach, a bi-directional tunnel is created between FA and HA, an IP-IP tunnel is created from a mobile node to FA, and another tunnel is created from P-CSCF to FA. Packets in encapsulated delivery style are transmitted using the bi-directional tunnel from FA to HA and vice versa. Packets in direct delivery style are transmitted from mobile node to FA or from P-CSCF to FA.

In another embodiment, a system and method for mitigating trombone routing using the SIP-base mobility protocol is presented. In this approach, when a mobile node bootstraps, it obtains its IP address either from a stateful DHCP server or from stateless auto-configuration, because there are no MIP entities such as HA or FA. Hence, the registration message and reply use the standard routing path, avoiding trombone routing.

In another embodiment, a system and method for mitigating trombone routing in a MIPv6 network by using CoA in the mobile's registration message instead of the home address as the contact address is presented.

In another embodiment, a system and method for mitigating trombone routing in a MIPv4 FA-CoA network having HA and S-CSCF on the same machine is presented. The SIP registration message is attached to an MIP control message. The MIP control message, along with the attached SIP registration message, is transmitted to the HA, and HA communicates with S-CSCF.

In another embodiment, a system and method for mitigating trombone routing in a MIPv4 network having home agents, known as dynamic home agents, close the the mobile node's visiting networks is presented. Placing the home agents close to foreign agents minimizes the routing path.

In another embodiment, a system and method for mitigating trombone routing in a MIPv4 and a MIPv6 network, a policy agent is added at the foreign agent. The policy agent decides whether to send the signaling via tunneling to the HA or directly to P-CSCF.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 1a illustrates a Trombone Routing in MIPv4 FA-COA during SIP Registration;

FIG. 1b illustrates a Trombone Routing in MIPv4 FA-COA during SIP Invite;

FIG. 11 illustrates a schematic of SIP Mobility that avoids trombone routing;

DETAILED DESCRIPTION OF THE INVENTION

In order to avoid the trombone routing and speed up the handoff, several solutions are presented that help mitigate the trombone routing effect. These can broadly be divided into the following:

a) Piggy-backing SIP registration over MIP (Split at FA);
b) Selective Reverse Tunneling and Tunneling between FA and P-CSCF;
c) The SIP-based mobility protocol;
d) Use of CoA during SIP registration and call up in MIPv6;
e) Piggy-backing SIP registration when HA and S-CSCF Co-exist;
f) Using Dynamic Home Agents in MIPv4 FA-CoA; and
g) Interceptor-Caching Approach.

Each of these solutions will be described below.

A. Piggy-Backing SIP Registration Over MIP

In this approach, MIP and SIP signaling on control plane are integrated, enabling SIP messages to be delivered as part of MIP control messages, bypassing the FA-HA tunnel. The transport of data is not affected. DHCP operation is dropped because the Mobile Node does not need the IP address of the P-CSCF. Instead, FA needs to know the IP address of the corresponding P-CSCF in advance, and, since FA and P-CSCF are stationary, the IP address of P-CSCF can be preconfigured in the FA. Accordingly, MIP and SIP registrations can be independent and their operations can perform simultaneously in parallel. Specifically, SIP registration does not need to wait until the routing paths for the SIP messages are completely established through the MIP.

Figure 7:
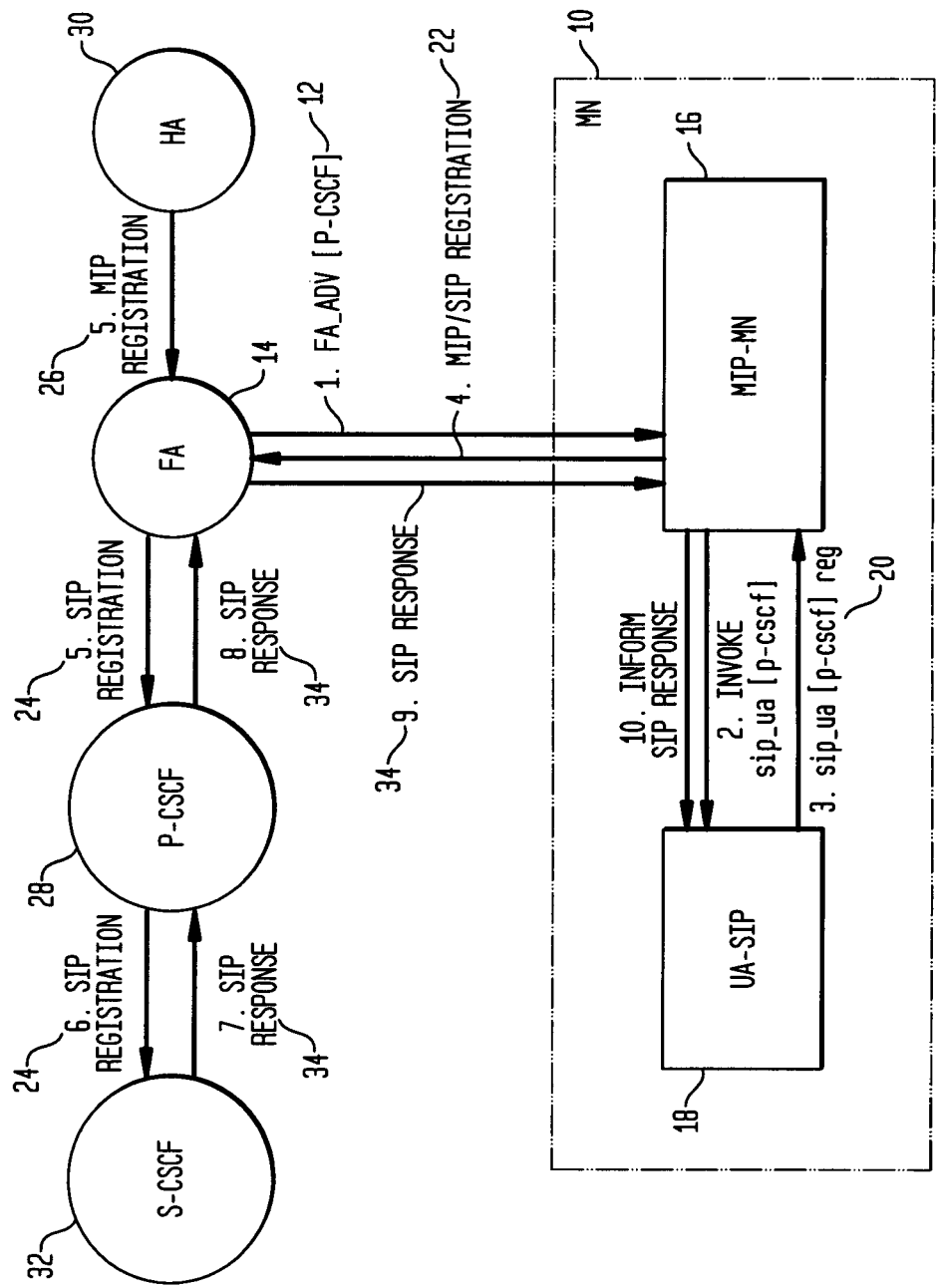
FIG. 7 illustrates the operation of MIP and SIP Integration on Control Plane.
Figure 8:
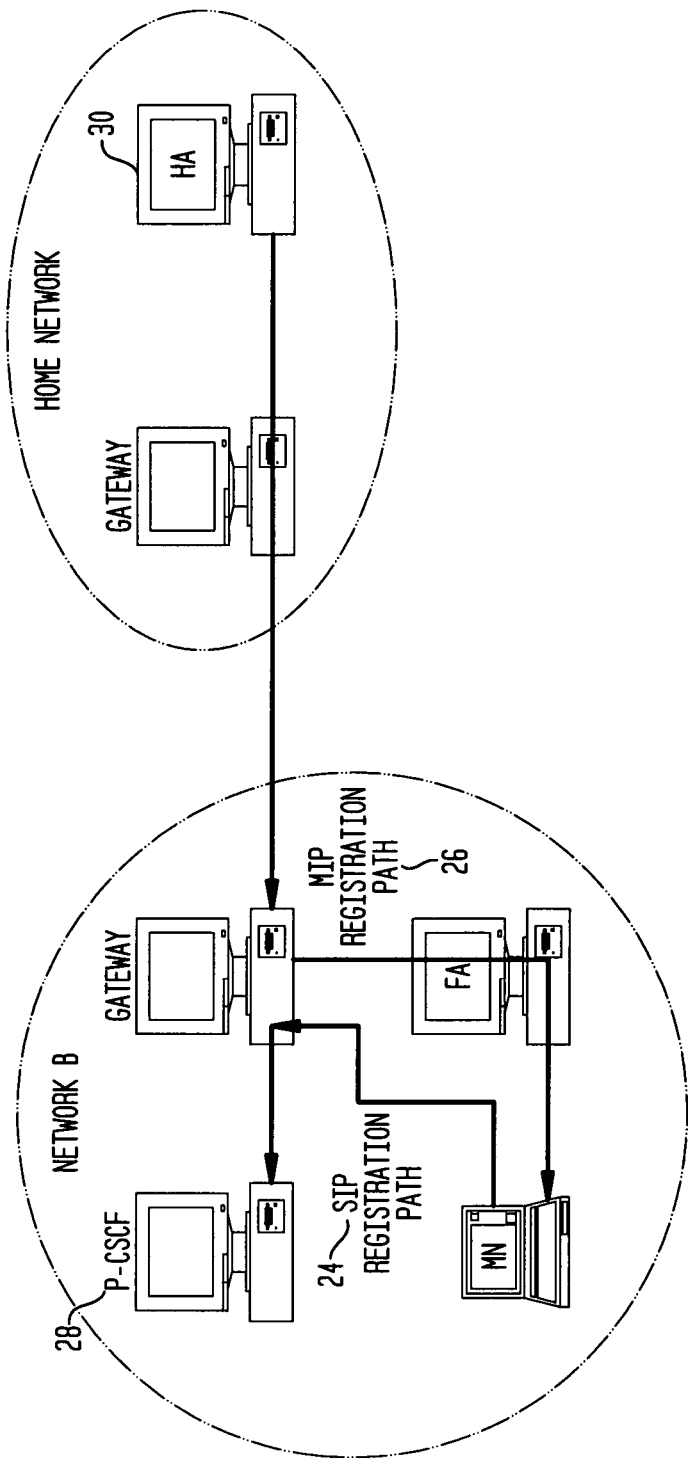
FIG. 8 illustrates SIP and MIP Message Paths.
Figure 9:
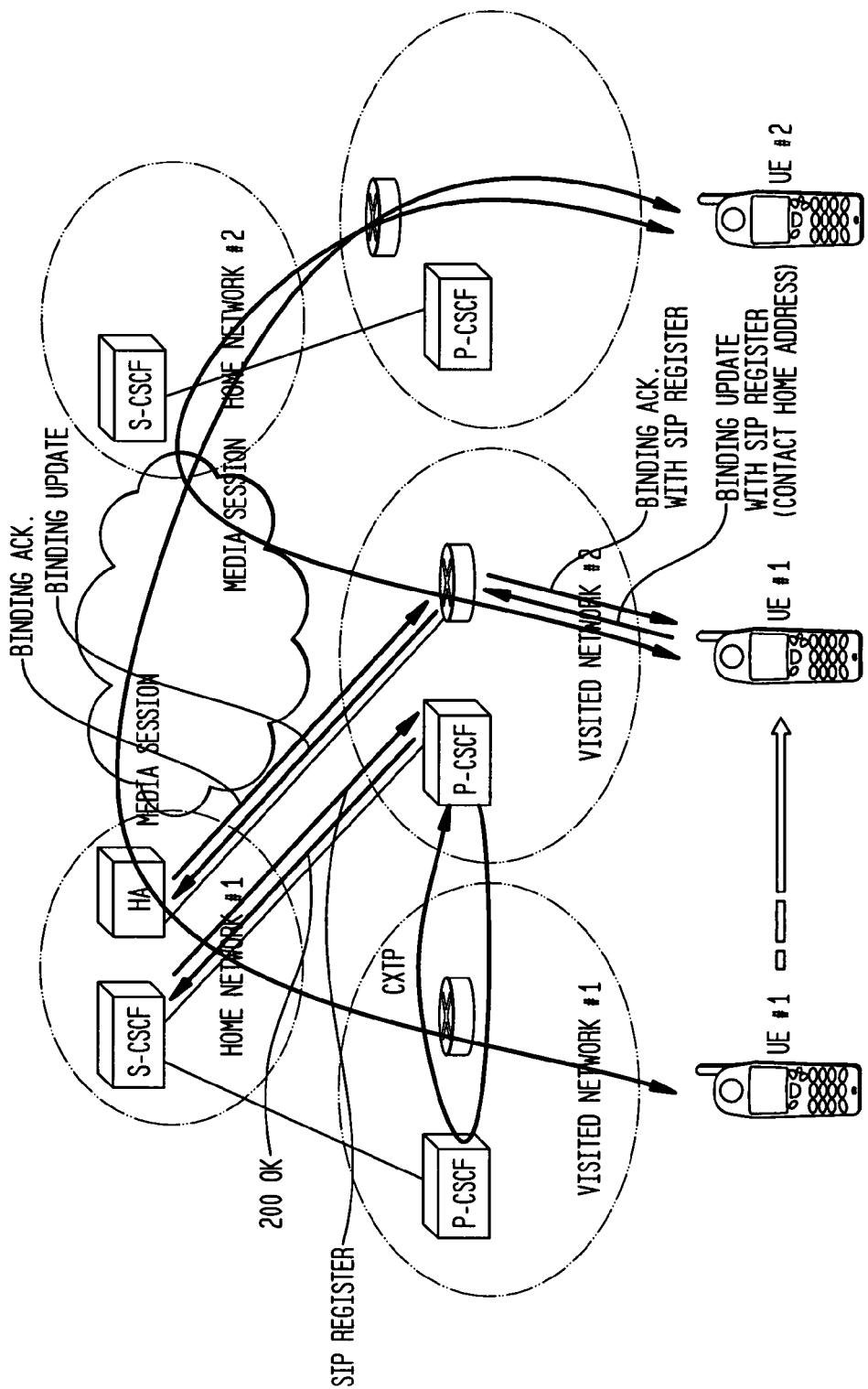
FIG. 9 illustrates a typical deployment scenario of MIP and SIP Integration on Control Plane.

FIG. 7 illustrates the operation of MIP and SIP integration on a control plane. FIG. 8 illustrates the route paths for both SIP and MIP registration messages. FIG. 9 shows a typical deployment scenario of an integration of SIP and MIP.

Operational Procedure of Piggy-Backing

As shown in FIG. 7, the operation of the piggy-backing of SIP registration over MIP can be performed using the following steps.

1. MN 10 receives the FA advertisement 12 with a new P-CSCF address from the new FA 14.
2. The MIP process (MIP-MN) 16 on the Mobile Node 10 informs the SIP User Agent (UA-SIP) 18 on the Mobile Node 10 of the detection of a new P-CSCF.
3. UA-SIP initiates a SIP registration by sending a signaling (e.g., sip_ua[p-cscf]) 20 to the MIP-MN 16.
4. MIP-MN 16 invokes MIP/SIP registration 22 with FA 14 through a MIP-specific messaging operation.
5. FA 14 invokes both MIP and SIP registration 24, 26 in parallel; the SIP registration message 24 is sent to P-CSCF 28, and the MIP registration message 26 is sent to HA 30. Note that here FA is not an IP layer forwarding node; instead, it plays a role as an application-specific relaying node.
6. The SIP registration message 24 is delivered to the S-CSCF 32.
7. A SIP response message 34 is delivered to the P-CSCF 28.
8. The P-CSCF 28 sends the SIP response message 34 to the FA 14 which is enabled to parse SIP messages; this SIP response message can be sent as an MIP message, UDP message, or SIP message.
9. FA 14 sends the SIP response message 34 to the Mobile Node 10 through MIP-MN 16.
10. Finally, MIP-MN 16 informs the UA-SIP 18 of the notification of SIP response, and the SIP registration is completed.

In this operating procedure, SIP messages from/to the Mobile Node to/from P-CSCF traverse according to the routes set by the regular IP routing not by MIP. Hence, no FA-HA tunnel is used for forwarding the messages.

As shown in FIG. 8, the path of a SIP registration message 24 from the Mobile Node 10 to the P-CSCF 28 is:
  MN→Gateway in Network B→P-CSCF
The path of a MIP registration message 26, also shown in FIG. 8, from HA 30 to the Mobile Node 10 is:

HA→Gateway in Home Network→Gateway in Network B→FA→MN

This approach requires modifying both FA and the MIP client from their original configurations, for example, FA must be able to parse SIP messages. In addition, a filtering mechanism must be installed at the router. However, this approach offers a reduction in the number of signaling messages, and also enables two protocols, SIP and MIP, to be combined into one.

B. Selective Reverse Tunneling and Tunneling Between FA and P-CSCF

Figure 10:
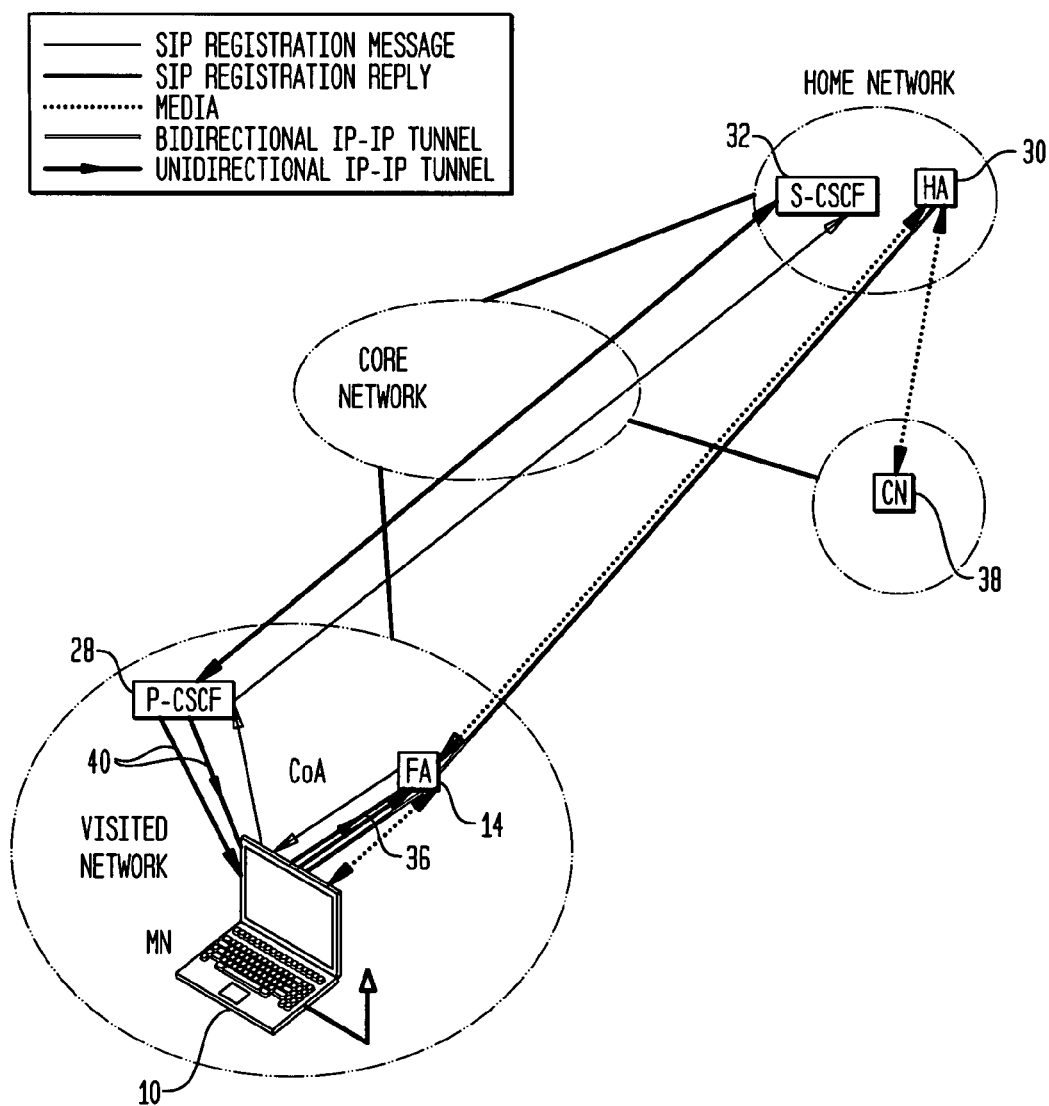
FIG. 10 illustrates a schematic of Selective Reverse Tunneling.

Another approach avoids trombone routing by using selective reverse tunneling and an encapsulation technique between the FA 14 and P-CSCF 28. FIG. 10 schematically illustrates selective reverse tunneling using one visiting network and one home network.

As discussed above, the root cause of the trombone routing problem is the use of reverse tunneling at the FA 14. The Internet Engineering Task Force (IEFT) protocol specifies Encapsulated Delivery style of packets between the Mobile Node 10 and FA 14, wherein the Mobile Node 10 sets up a tunnel 36 to the FA 14. The primary objective of this tunnel is to allow broadcast packets from the Mobile Node to be sent to their home network via reverse tunneling. In this approach, the IP header fields for packets received via the MN-FA tunnel 36 at the FA 14 are as follows:

Outer IP header: source=MN's home address, destination=FA's address

Inner IP header: source=MN's home address, destination=CN's address

To minimize trombone routing problems, a means to leverage the Encapsulated Delivery style to perform Selective Reverse Tunneling is presented. This is intended to support packet delivery to local resources and can be used to optimize delivery to the P-CSCF in the visited network. In this case, the Mobile Node can request the FA to perform Selective Reverse tunneling as follows:

Packets meant to be reverse tunneled are sent using Encapsulated Delivery style via the MN-FA tunnel 36. The FA 14 must reverse tunnel these to the HA 30. The Mobile Node 10 can send all media packets using Encapsulated Delivery style of packets to ensure delivery to the CN 38 via the HA 30.

Packets NOT meant to be reverse tunneled are sent using Direct Delivery style (not encapsulated). The FA will forward these and will not reverse tunnel them to the HA. Hence, the Mobile Node can send all packets meant for the P-CSCF using normal IP routing, because the FA will forward these as regular packets.

Selective Reverse Tunneling with Encapsulated Delivery style of packets solves one part of the trombone routing problem by optimizing the route from the Mobile Node to the P-CSCF. However, packets from the P-CSCF to the Mobile Node will still be routed via the HA. The inefficiency and/or delay caused by this routing can be alleviated by establishing an IP-IP tunnel 40 between the P-CSCF 28 and the FA 14 for all packets destined for the Mobile Node 10 from the P-CSCF 28. Using this approach, the IP header fields for packets received at the FA from the P-CSCF are as follows:

Outer IP header: source=P-CSCF's address, destination=FA's CoA

Inner IP header: source=P-CSCF's address, destination=MN's address

The encapsulated packets received at the FA via the P-CSCF—FA tunnel 40 will be de-capsulated at the FA and forwarded to the MN. The de-capsulation is performed in a manner identical to that in which encapsulated packets received at the FA via the HA-FA tunnel are processed.

The use of Selective Reverse Tunneling requires the following enhancements to the system architecture.

1) Establishment of MN-FA tunnel 36 for Encapsulated Delivery style of packets. This may be done after the Mobile Node 10 has registered with the FA 14. In one embodiment, the tunnel establishment capability should be available in an RFC3024 compliant MN.

2) Use of Direct Delivery style for P-CSCF targeted packets at MN. This is generally an RFC3024 compliant capability. It can be set up after the Mobile Node registers with the FA and has received the P-CSCF address via DHCP. This requires the establishment of a P-CSCF specific route at the Mobile Node that bypasses the MN-FA tunnel.

3) Selective Reverse Tunneling at FA. This capability generally is RFC3024 compliant and should be activated after the Mobile Node registers with the FA.

4) Establishment of a bi-directional tunnel between P-CSCF and FA. This requires extending the P-CSCF's capability. The tunnel should be established after the SIP registration message (e.g., REGISTER) is received at the P-CSCF via the FA. In addition, a routing table entry should direct all packets to the Mobile Node via this tunnel. This will ensure delivery of SIP replies via the tunnel.

This approach is somewhat complex because of the additional tunnels and the overhead they require. Like the piggybacking approach, a filtering mechanism is needed at the router. This approach makes use of standard system features and does not necessitate any changes to the MIP protocol.

C. The SIP-Based Mobility Protocol

A third approach to avoid trombone routing is to use the SIP-based mobility protocol. FIG. 11 illustrates a schematic of SIP registration and SIP Call Setup in SIP-based mobility, avoiding trombone routing.

In SIP-based mobility, the Mobile Node 10 does not use an MIP entity or mobile IP component for providing mobility binding. Thus, there is no HA or FA, nor any equivalent therefore. When the Mobile Node bootstraps, i.e. boots up, in a visited network 42, Mobile Node must re-register and, if any session parameters have changed, Mobile Node must also re-INVITE. When the bootstrapping occurs, Mobile Node 10 obtains its IP address either from a stateful DHCP server, or by means of stateless auto-configuration. While obtaining its IP address, Mobile Node receives additional server configuration information, including the address of P-CSCF 28, from the DHCP server (not shown), typically using DHCP INFORM.

As Mobile Node 10 sends a registration message to S-CSCF 32, it sends the new CoA as the new contact address and the address of P-CSCF in the network's subnet. Thus, at any point in time, HSS knows the new contact address of the mobile and its corresponding P-CSCF address. Since there is no HA or MIP, the registration message and reply follow the standard routing path, and neither are subjected to trombone routing.

When a caller generates a new call or INVITE to the Mobile Node, the call is routed to S-CSCF using the Mobile Node's Universal Resource Identifier (URI). When the S-CSCF gets this new call, S-CSCF consults the registration database, and routes the call to the P-CSCF responsible for that Mobile Node. Since the contact address of the Mobile Node is still the new CoA obtained in the new network, P-CSCF looks up the contact address and forwards the call to the mobile using standard routing process. Thus trombone routing is avoided for both the call setup and the registration process. Using this procedure, delay during re-registration procedure is lessened, reducing the handoff delay during a Mobile Node's movement from one subnet to another.

This approach supports only SIP-based applications such as VoIP, streaming, and chat, and, at present, is not yet standardized. However, no protocols, such as MIP or SIP, need to be changed to use this approach, and standard SIP signaling is used.

D. Using CoA During SIP Registration and Call Up in MIPv6

Next, a method for avoiding trombone routing by using CoA instead of the home address as the contact address in the Mobile Node's registration message is presented. FIG. 12 shows a schematic diagram illustrating how trombone routing can be avoided using MIPv6 with CoA during SIP Call Setup.

While it is mandatory that the media between CN 38 and Mobile Node 10 must travel via the HA 30, having the signaling traverse through HA 30 may not be necessary. Hence, registration with CoA as the contact address in S-CSCF 32 could alleviate some of the trombone routing problems that are often observed in typical MIPv6 networks.

The operation of this approach is as follows. While in a visited network, a Mobile Node sends a request to register, and receives a registration address that can be used as the Mobile Node's CoA, instead of HA as CoA. This CoA is stored in S-CSCF. Hence, when a call is placed to this Mobile Node, S-CSCF finds this mobile node using the stored CoA, and the request does not need to be transmitted to the HA to obtain a CoA for this Mobile Node. Hence, trombone routing is avoided in call setup.

Figure 12B:
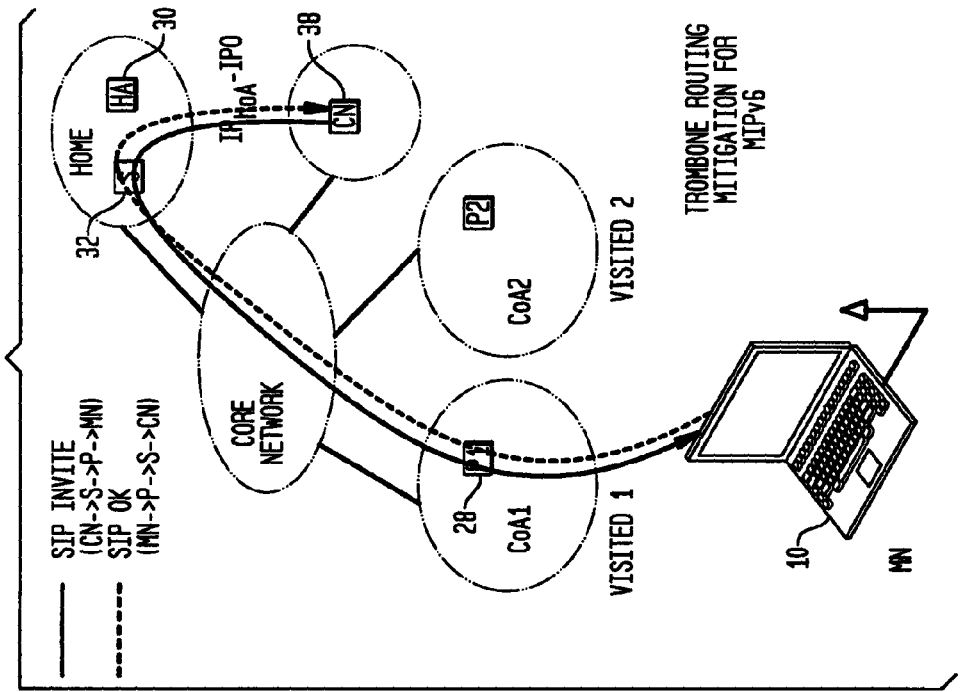
FIG. 12b illustrates a schematic of the Selective Reverse Tunneling and CoA approach for MIPv6 during SIP Call Setup.
Figure 12A:
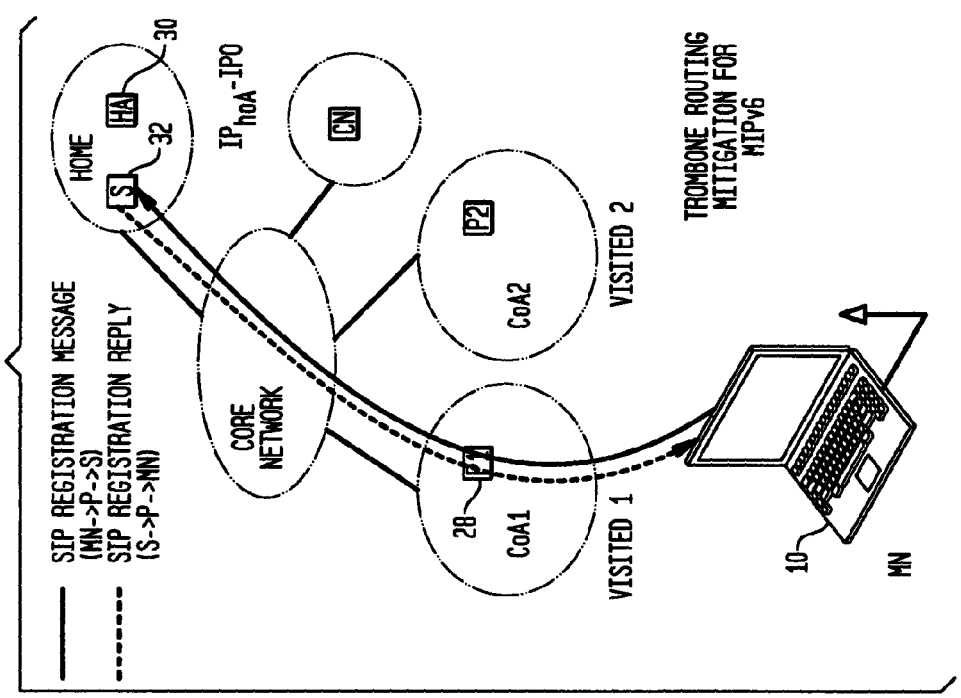
FIG. 12a illustrates a schematic of the Selective Reverse Tunneling and CoA approach for MIPv6 during SIP Registration.

FIG. 12a) illustrates the path of a SIP registration message in MIPv6 to be:
MN→P-CSCF→S-CSCF
and the path of a SIP registration Reply message is:
S-CSCF→P-CSCF→MN.
Similarly, the path of a SIP INVITE, as shown in FIG. 12b), is:
CN→S-CSCF→P-CSCF→MN
and the path of a SIP OK is:
MN→P-CSCF→S-CSCF→CN This approach is limited to MIPv6 in which CoA is used, as opposed to MIPv4 which requires FA and CoA. Standard system features can be used and no protocol changes are necessary for implementation of this approach.

E. Piggy-Backing SIP Registration when HA and S-CSCF Co-Exist

This method borrows some of the concepts from the approach of Piggy-backing SIP registration over MIP, discussed above. In this situation, HA 30 and S-CSCF 32 co-exist on the same machine, and HA 30 has a binding cache. SIP registration URI and P-CSCF address is sent as part of the MIP update. As with the piggy-backing method discussed above, SIP registration information is attached to the MIP message, and all the SIP related registration information is sent as part of MIP binding update. However, the MIP/SIP message does not get split at FA 14 as with the prior piggy-backing approach. Instead, HA 30 passes the SIP related messages to the logical entity S-CSCF 32 that resides on the machine with HA 30. Trombone routing is avoided by using Inter Process Communication instead of passing signals over the long distance.

Operation of this approach is as follows. The SIP registration URI and P-CSCF address is attached to or bound with the MIP registration message. This MIP message is sent via FA to HA which passes the SIP registration information using Inter Process Communication.

This approach requires that both HA and S-CSCF co-exist on the same machine, and the technique offers reduction of signaling and parallelization of processes.

F. Using Dynamic Home Agents in MIPv4 FA-CoA

As discussed above, the root cause of the trombone routing problem is that, without MIPv4 route optimization, every packet needs to traverse through the HA 30. Accordingly, another approach to mitigating the problem of such additional routing can be found by introducing Home Agents close to Mobile Node's visiting networks. These HAs are commonly known as Dynamic Home Agents (DHA) 44, or Mobility Agents (MA) 44. Dynamic home agent assignments are supported by the MIPv4 protocol. By placing Home Agents 30 close to Foreign Agents 14, one can minimize the routing path to a great extent.

Figure 13:
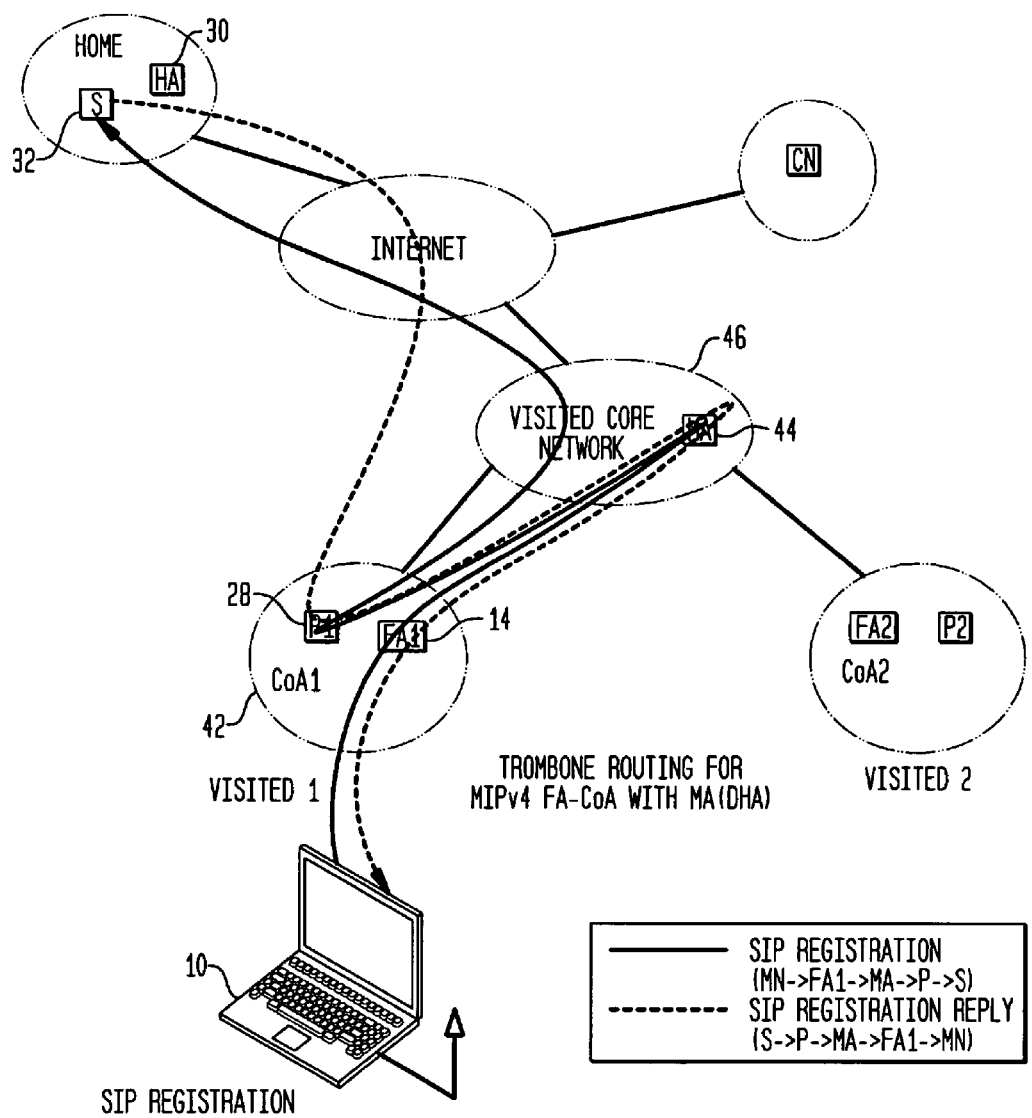
FIG. 13 illustrates another Trombone Routing in MIPv4 FA-COA for SIR Registration.
Figure 14:
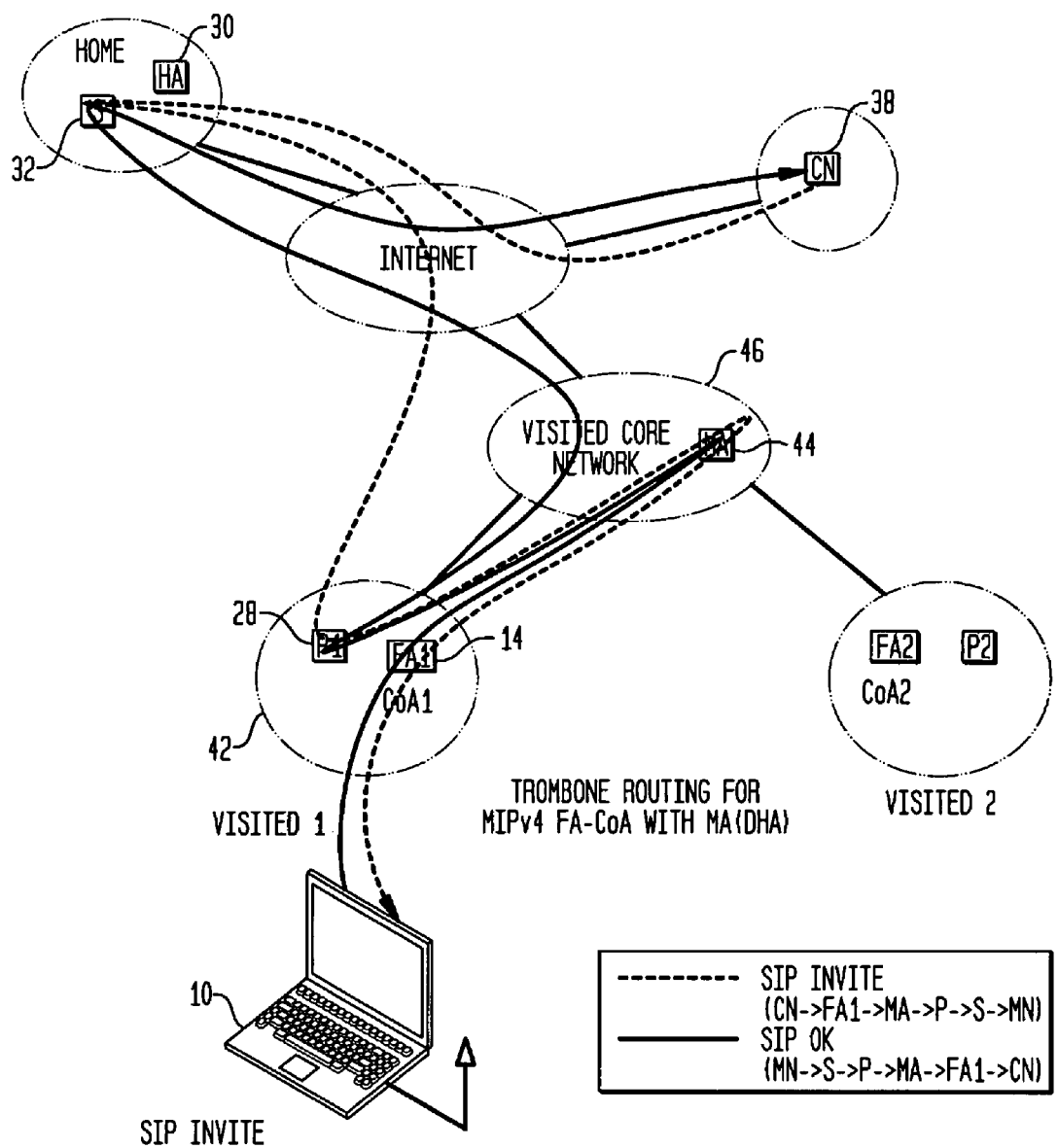
FIG. 14 illustrates another Trombone Routing in MIPv4 FA-COA for SIR INVITE.

FIGS. 13 and 14 depict the scenario whereby MAs 44 are deployed in the visited core network 46 of MIPv4 FA-CoA, thereby reducing the path traversal for both signaling and media. Hence, as shown in FIG. 13, the path of a SIP registration message with MA (or DHA) in MIPv4 FA-CoA is:
MN→FA1→MA→P-CSCF→S-CSCF
and the path of a SIP registration Reply message is:
S-CSCF→P-CSCF→MA→FA1→MN.
Similarly, the path of a SIP INVITE, as shown in FIG. 14, is:
CN→FA1→MA→P-CSCF→S-CSCF→MN
and the path of a SIP OK is:
MN→S-CSCF→P-CSCF→MA→FA1→CN It is important to note that it is not necessary to deploy MA 44 in every subnet. Depending upon the topology and size of the visiting network 42, multiple MAs can be deployed. However, one MA 44 can handle multiple FAs 14 since it will be usually placed one level higher than subnet level. Several mobility optimization protocols published in the literature, such as Regional Registration, IDM, use the same concept of Dynamic Home Agent. In the sections below, DHA assignment procedures, registration procedure with the old HA, functionalities of MA, packet handling procedures at MA, and dynamic DNS update are described.

Dynamic Home Agent Assignment Procedures

For DHA assignment, FA in the visiting network must include the 'D' flag in the agent advertisement message. The 'D' bit occupies the first reserved bit after the other flag bits specified in RFC 3220. FA must also include its Network Access Identifier (NAI) in the agent advertisement message. By comparing the advertising FA's NAI with its own NAI, Mobile Node can determine whether or not it is in its home domain.

Figure 15:
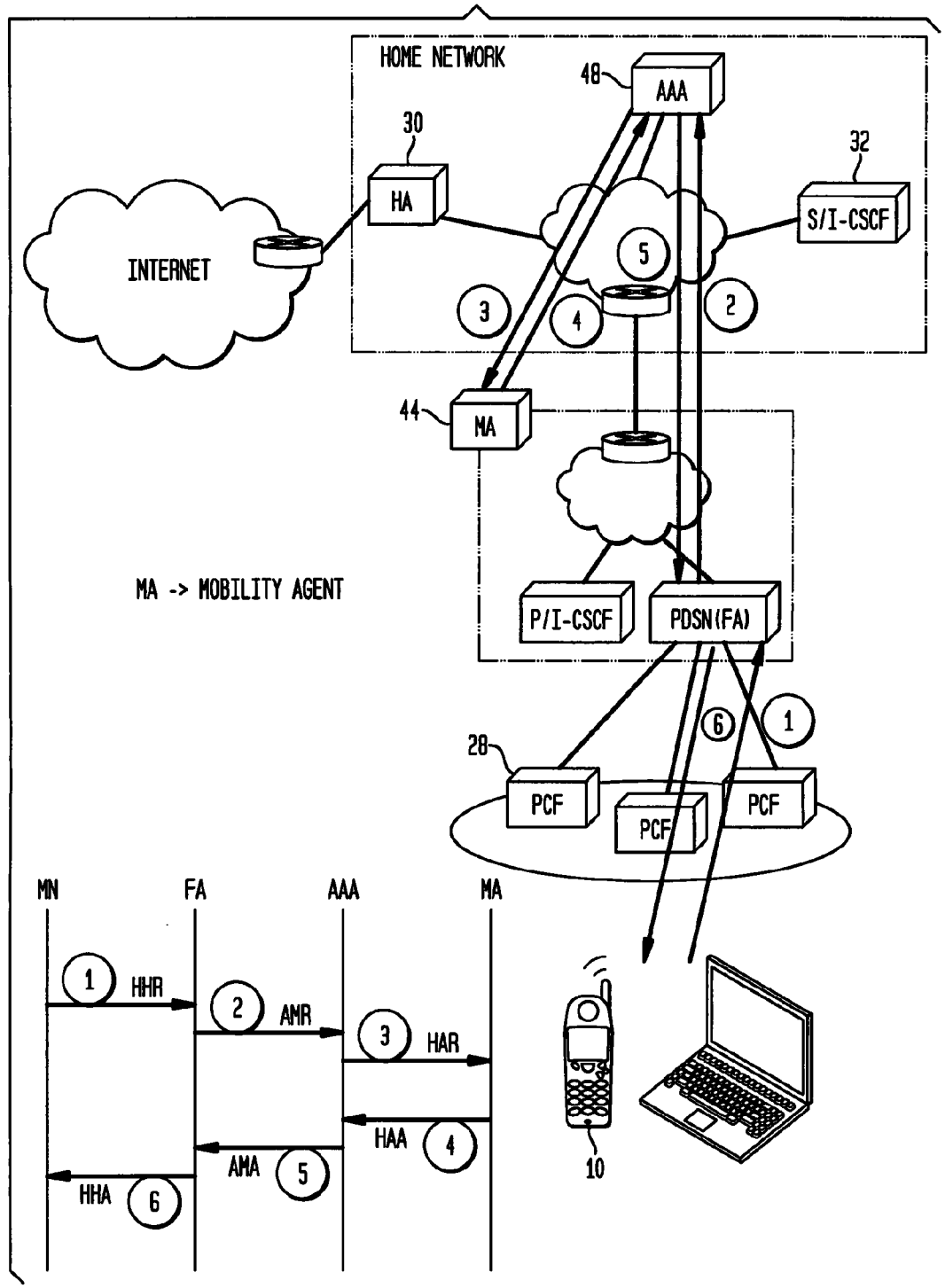
FIG. 15 illustrates Dynamic Home Agent Assignment.

The signaling procedures and message exchanges for DHA assignment are shown in FIG. 15, including the detailed call flow. The operation of these procedures and message exchanges is as follows:

1. When the Mobile Node 10 arrives on the visiting network 42, Mobile Node 10 sends a dynamic HA handover request (HHR) message to the FA 14.
2. After receiving this message, FA 14 constructs an AA-Mobile-Node-Request (AMR) message in a pre-defined format, and sends AMR to the serving Authentication, Authorization, and Accounting (AAA) 48 server.
3. The AAA server 48 authenticates the Mobile Node 10 and assigns it an MA 44. The AAA server 48 then sends a Home-Agent-MIP-Request (HAR) message to the assigned MA 44.
4. The MA 44 will then assign a new home address to the Mobile Node 10 and return this new address in a Home-Agent-MIP-Answer (HAA) message to the AAA server 48.

5. AAA server 48 will then send an AA-Mobile-Node-Answer (AMA) message to the FA 14.
6. Subsequently, Mobile Node 10 will receive a dynamic HA handover answer (HHA) message from the FA 14.

Hence, the signaling message sequence is:
HHR→AMR→HAR→HAA→AMA→HHA.

In one embodiment, the HHR message can be defined as the Registration Request message in RFC 2002, but with the following changes:

| | |
|---|---|
| Type | 4 (Dynamic HA Handover Request) |
| Home Address | The current address for simultaneous HA bindings, otherwise null address (0.0.0.0) |
| HA Address | null address (0.0.0.0) |
| CoA | Care of address of FA |
| Extension | Mobile Node NAI Extension |

The Mobile Node must include its NAI or fully qualified domain name (FQDN) in the extension for authentication purpose. The Mobile Node must set 'S' bit in its HHR message if it requires simultaneous HA bindings.

On the other hand, if Mobile Node obtains a temporary address from either DHCP or point to point protocol (PPP) before the HA assignment and wants to use this temporary address as its new home address, Mobile Node must set the home address field in the HHR message to be this dynamically allocated temporary address. When FA sends the AMR message to the AAA server, the Mobile-Node-Home-Address-Requested flag in the MIP-Feature-Vector AVP must be set to zero to indicate that no further home address needs to be assigned to the Mobile Node.

Registration Procedure with Old HA

For seamless handover, Mobile Node must send a registration request message to the old HA. The registration is sent directly to the old HA with the fields as specified below:
Home Address: the old Home Address
HA Address: the old HA Address
CoA: the new Home Address (e.g., MA Address)

Since the CoA of the old home address is set to the new home address, all the packets destined to the old home address will be redirected to the new home address of the Mobile Node by the old address after successful registration. The MA will then intercept all packets destined to the Mobile Node and forward them to the current location of the Mobile Node.

Functionalities of Mobility Agent

As mentioned earlier, Mobility Agent (MA) is a home agent that is dynamically assigned and has similar functionalities to an HA. For example, MA accepts the home registration request from the Mobile Node with the old HA. MA also has some behaviors like FA. For example, after receiving the home registration request, MA relays the request to the old HA. However, MA does not broadcast any FA advertisement and also does not provide any CoA address to the Mobile Nodes. Typically, MA will be placed one level higher than FA.

Packet Handling Procedures at MA

The MA should maintain two user lists. One user list is for normal HA function and the other is for seamless HA handover. For seamless handover, MA keeps a binding list that has <MN_Old_Home_Addr, MN_New_Home_Addr> information. For seamless session, MA will receive packets that are encapsulated by the old HA. For encapsulated packets, MA compares the inner destination address of the encapsulated packet with MA's binding list and, if there is a match, MA determines that it has received a packet whose inner destination address is the old home address. Then MA can de-capsulate the encapsulated packet or datagram, and tunnel it to Mobile Node's current location, that is, re-capsulating the datagram with the current CoA of the Mobile Node. For un-encapsulated packets destined to new home address of Mobile Node, MA should function like a normal HA of the Mobile Node.

In case of security association, MA needs to maintain two SAs: i) one is with the Mobile Node (a.k.a. MA-MN) employing the MN-HA registration key, and ii) another one is old HA (a.k.a. MA-OHA) employing the FA-HA registration key. During subsequent moves, for example, when Mobile Node changes the FA but does not change the MA, Mobile Node should send the registration request to the MA with Mobile Node's new CoA. When MA receives such registration request, MA should verify the previous home address in its HA binding list and respond with the registration reply accordingly.

Dynamic DNS Update

Mobile Node should perform a secure dynamic DNS update with its Authoritative Domain name Server (ADS) to update Mobile Node's name bindings after it gets a new home address. An alternative approach could be that a DHCP server can update the DNS if Mobile Node uses the new home address allocated by the DHCP server. By setting the 'S' bit in the DHCP_REQUEST, Mobile Node can delegate the DNS update to the DHCP server. In many cases where security is a concern for Mobile Node updating the DNS, delegating the DNS update may be a better approach.

G. Interceptor-Caching Approach

Yet another approach to trombone routing mitigation involves minimal changes to the FA and the mobile. Assuming reverse tunneling is mandatory for this approach, a policy agent or interceptor 50 at respective FA 14 is added. This policy agent 50 will snoop the incoming traffic and, based on the port number, the policy agent 50 will decide whether to send the traffic to the encapsulation agent or route it directly to P-CSCF 28. For example, if SIP signaling is usually carried over port 5060, then the policy agent 50 will have the ability to capture the packets, inspect each one, and selectively send these packets either to the encapsulating agent for tunneling it to HA 30 or send these packets directly to P-CSCF 28. Thus, any traffic other than SIP traffic will be sent back to HA 30 via reverse tunneling. This may include the media traffic as well. Hence, SIP related signaling such as REGISTER and INVITE messages will also traverse to P-CSCF 28 without being tunneled via HA 30, avoiding trombone routing. However, media traffic is a separate issue and needs to be addressed accordingly.

Figure 16:
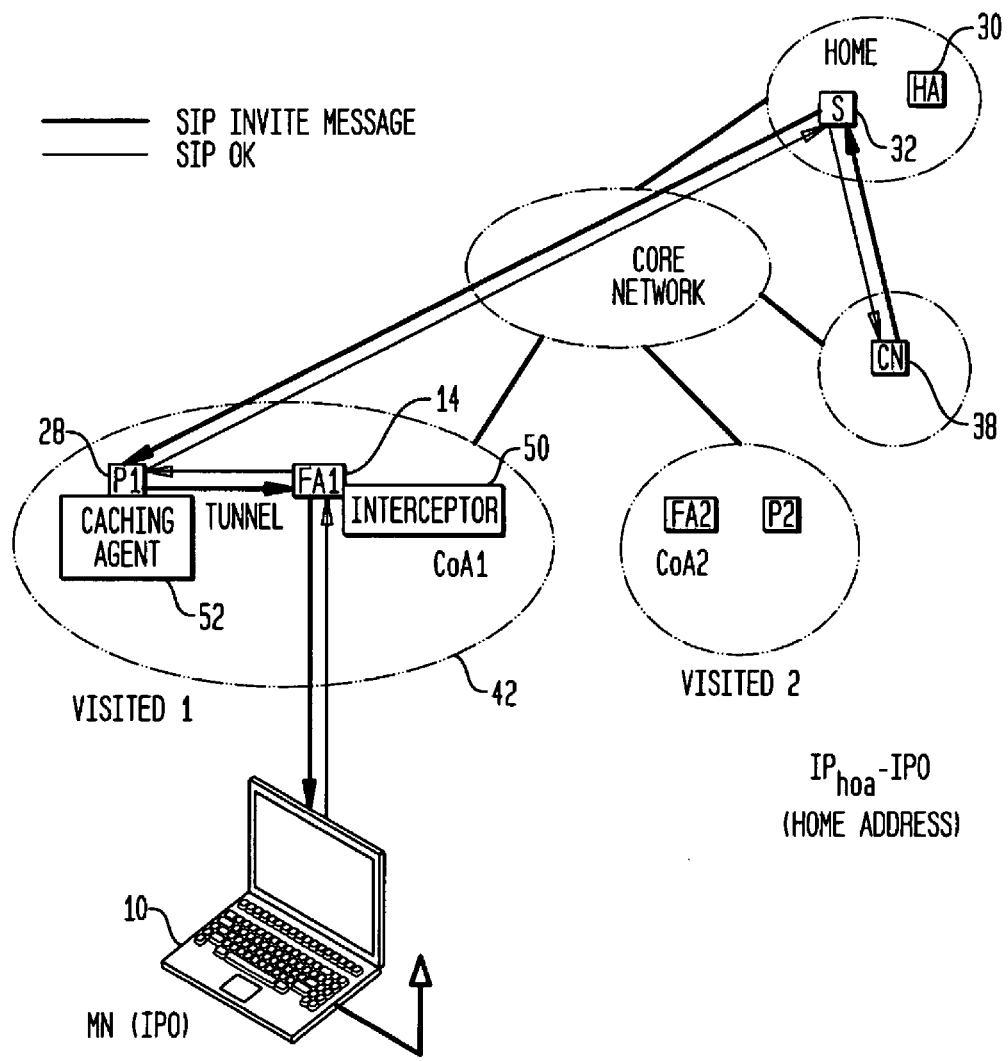
FIG. 16 illustrates Realization of Trombone Routing Mitigation for SIP INVITE.
Figure 17:
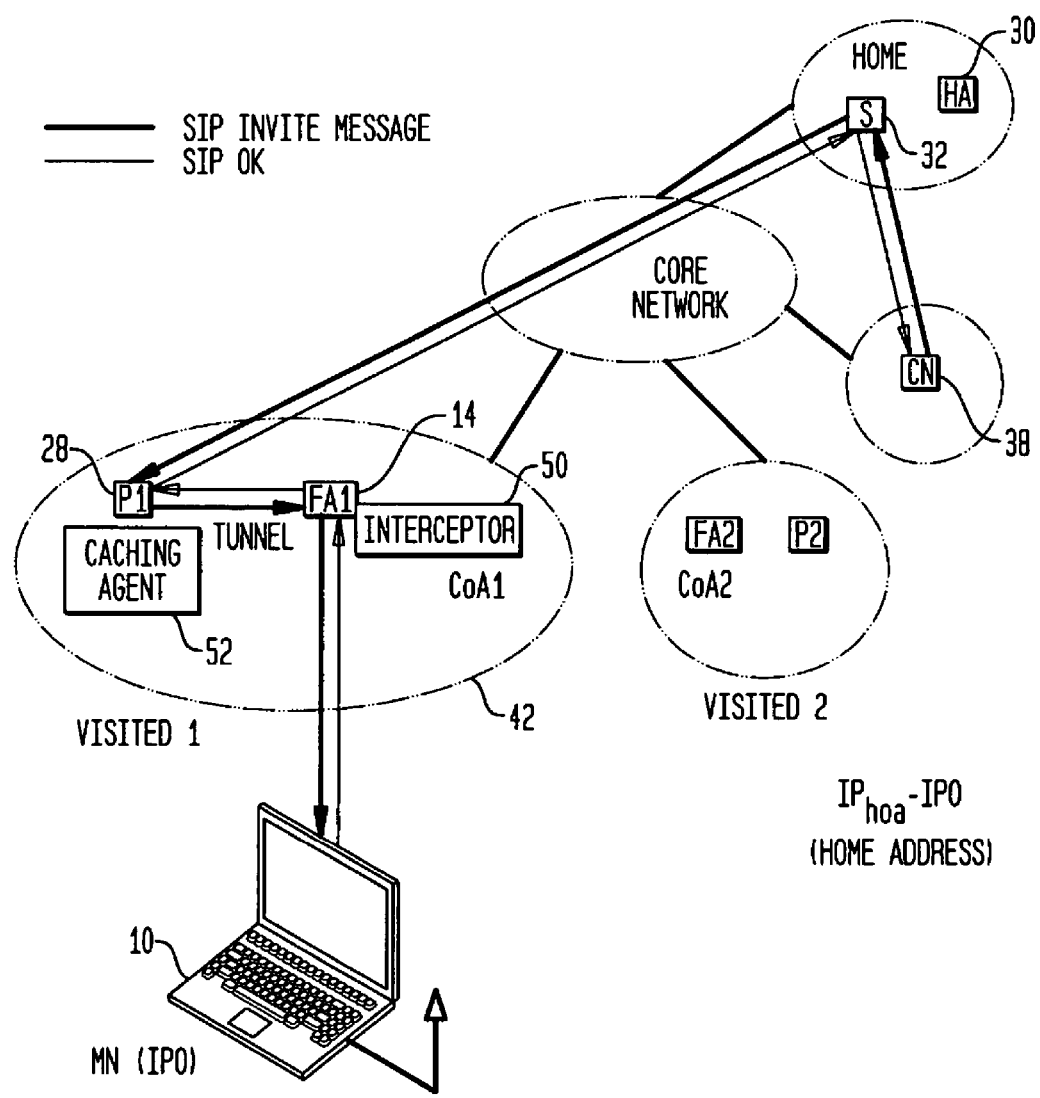
FIG. 17 illustrates Realization of Trombone Routing Mitigation for SIP Registration Message.

By virtue of reverse tunneling, any traffic destined to the Mobile Node 10 goes to HA 30 and gets tunneled to FA 14 before being delivered to P-CSCF 28. In this case, response messages for SIP REGISTER and SIP INVITE that are destined to Mobile Node 10 via P-CSCF 28 will also need to traverse to HA 30 before being intercepted by FA 14. As discussed above, this situation also adds an extra traversal between P-CSCF 28 and HA 30. In order to alleviate this problem, a caching functionality 52 at P-CSCF is introduced to map Mobile Node's HA 30 with the FA 14, and any message with a certain port number (e.g., 5060) that is destined to Mobile Node's HA 30 will be routed to FA 14 instead. The caching functionality at FA (not shown) and the dynamic routing ability will help route the packets of certain types destined to Mobile Node 10 via FA 14 instead of sending it to HA 30, as it does normally. FIGS. 16 and 17 illustrate trombone routing mitigation including some of the additional modules, e.g. interceptor 50 and caching agent 52, needed at the FA 14 and P-CSCF 28 as well as the protocol interaction between FA 14 and P-CSCF 28.

While the present invention has been described in particular embodiments, it should be appreciated that the present invention should not be construed as limited by such embodiments, but rather construed according to the below claims.

What is claimed is:

1. A method for registration and call setup of a mobile node in a visiting network, said method comprising the steps of:
    attaching a Session Initiation Protocol (SIP) registration message to a control message;
    transmitting said control message and attached SIP registration message from the mobile node to a first protocol component associated with the mobile node;
    simultaneously performing MIP registration using said control message and SIP authentication using said attached SIP registration message, said authentication comprising transmitting on a routing path without a home agent or foreign agent said attached SIP registration message from said first protocol component to a second protocol component, said routing path not traversing a home network of the home agent; and
    if said attached SIP registration message is authentic, transmitting via said routing path a reply to said attached SIP registration message to the mobile node, said reply having an IP address for said second protocol component, wherein said first protocol component is an application-specific relaying node.

2. A method for registration and call setup of a mobile node in a visiting network, said method comprising the steps of:
    attaching a Session Initiation Protocol (SIP) registration message to a control message;
    transmitting said control message and attached SIP registration message from the mobile node to a first protocol component associated with the mobile node;
    simultaneously performing MIP registration using said control message and SIP authentication using said attached SIP registration message, said authentication comprising transmitting on a routing path without a home agent or foreign agent said attached SIP registration message from said first protocol component to a second protocol component, said routing path not traversing a home network of the home agent; and
    if said attached SIP registration message is authentic, transmitting via said routing path a reply to said attached SIP registration message to the mobile node, said reply having an IP address for said second protocol component, wherein
    said first protocol component resides on a machine and said second protocol component resides on the machine, and said routing path is Inter Process Communication.

3. A system for registration and call setup of a mobile node in a visiting network, said system comprising:
    a first protocol component associated with a mobile node, said first protocol component being a signaling entity in a home network;
    a second protocol component being an application-specific relaying node;
    a routing path without a home agent or foreign agent between the first protocol component and the second protocol component, said routing path not traversing the home network;
    a Session Initiation Protocol (SIP) registration message;
    a control message; and
    a reply having an IP address for said second protocol component, wherein said SIP registration message is attached to said control message, and MIP registration is performed using said control message at the same time as SIP authentication is performed using said SIP registration message, and if said SIP registration message is authentic, said reply is transmitted via said routing path to the mobile node.

* * * * *

UNITED STATES PATENT AND TRADEMARK OFFICE
CERTIFICATE OF CORRECTION

| | | |
|---|---|---|
| PATENT NO. | : 8,565,186 B2 | Page 1 of 1 |
| APPLICATION NO. | : 11/898000 | |
| DATED | : October 22, 2013 | |
| INVENTOR(S) | : Dutta et al. | |

It is certified that error appears in the above-identified patent and that said Letters Patent is hereby corrected as shown below:

In the Specification

In Column 2, Line 18, delete "FIG. 1 a)," and insert -- FIG. 1a, --, therefor.

In Column 2, Line 23, delete "FIG. 1b)," and insert -- FIG. 1b, --, therefor.

Figure 2B:
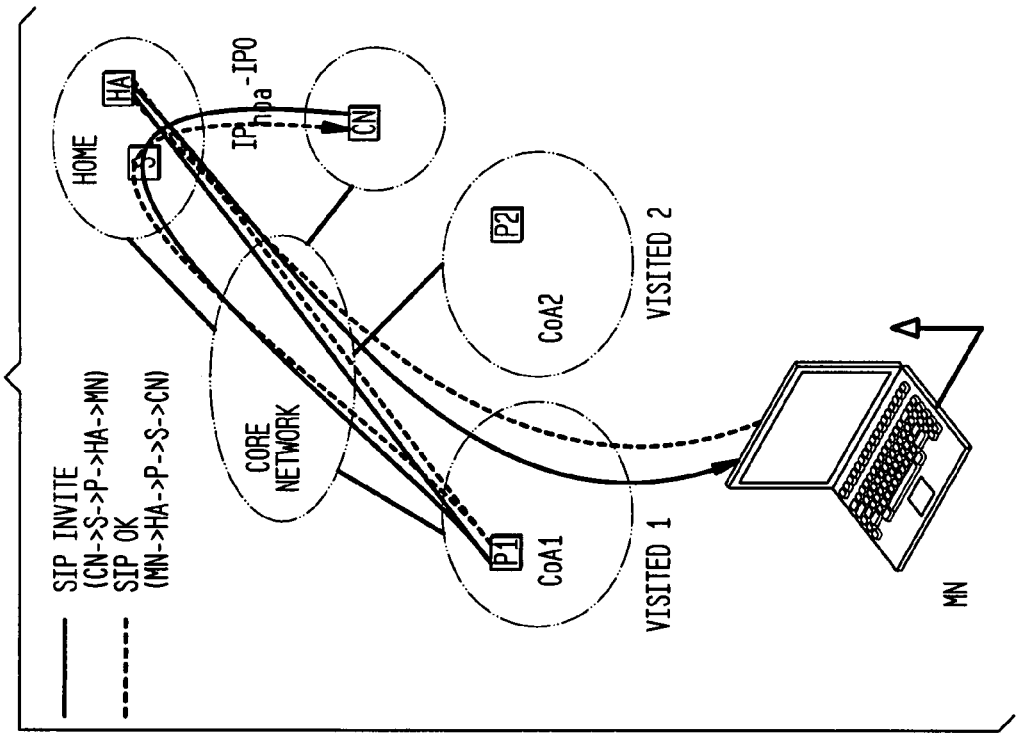
FIG. 2b illustrates a Trombone Routing in MIPv6 during SIP Registration and Call Setup.
Figure 2A:
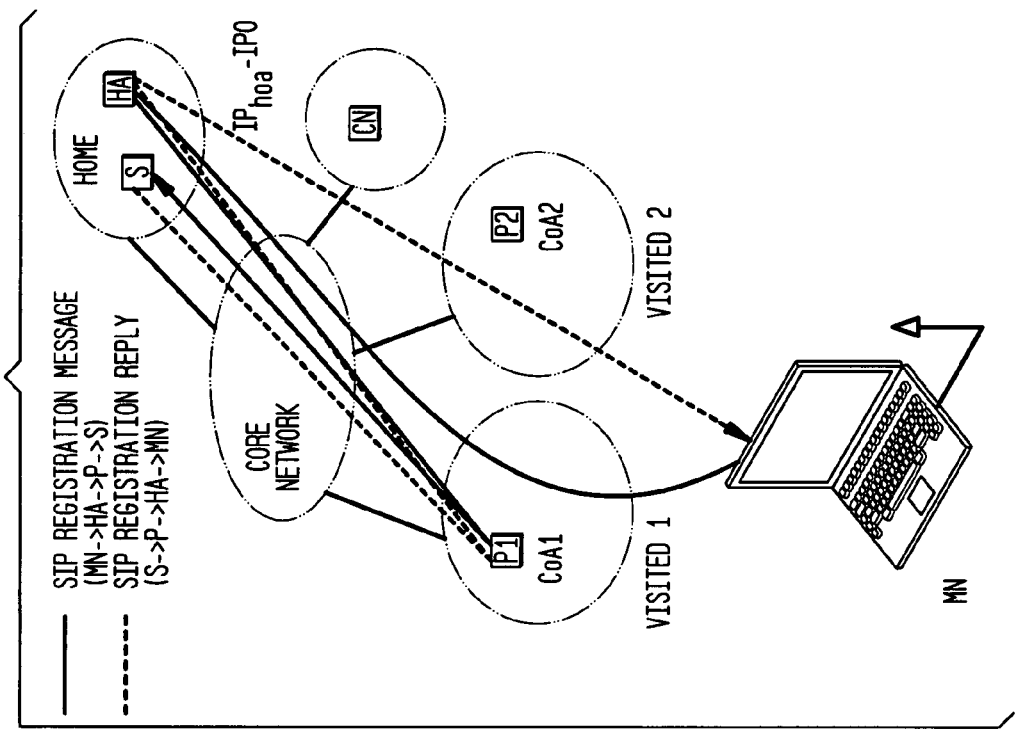
FIG. 2a illustrates a Trombone Routing in MIPv6 during SIP Registration.
Figure 3:
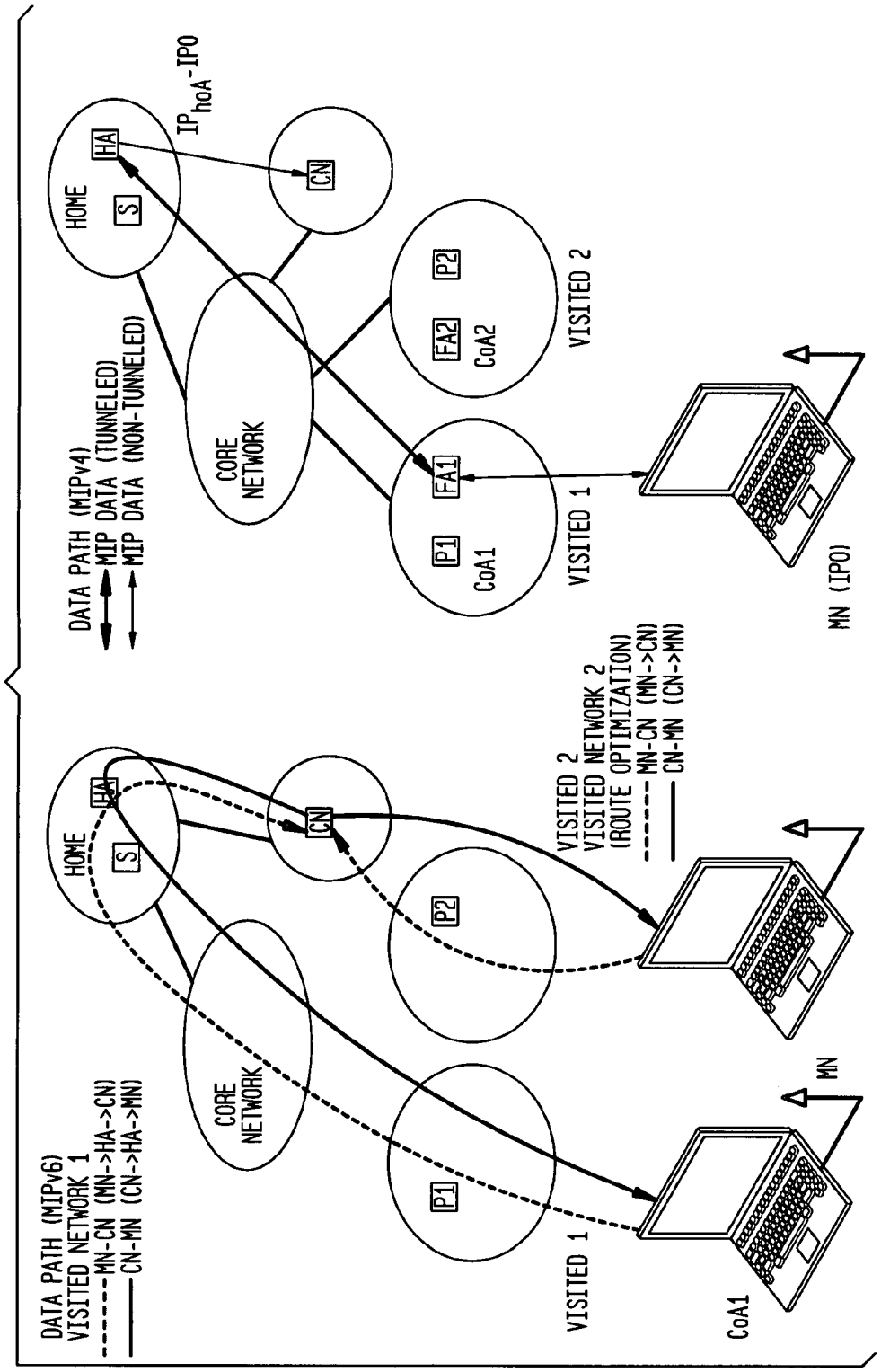
FIG. 3 illustrates a Trombone Routing for Media in MIPv4 and MIPv6.
Figure 4:
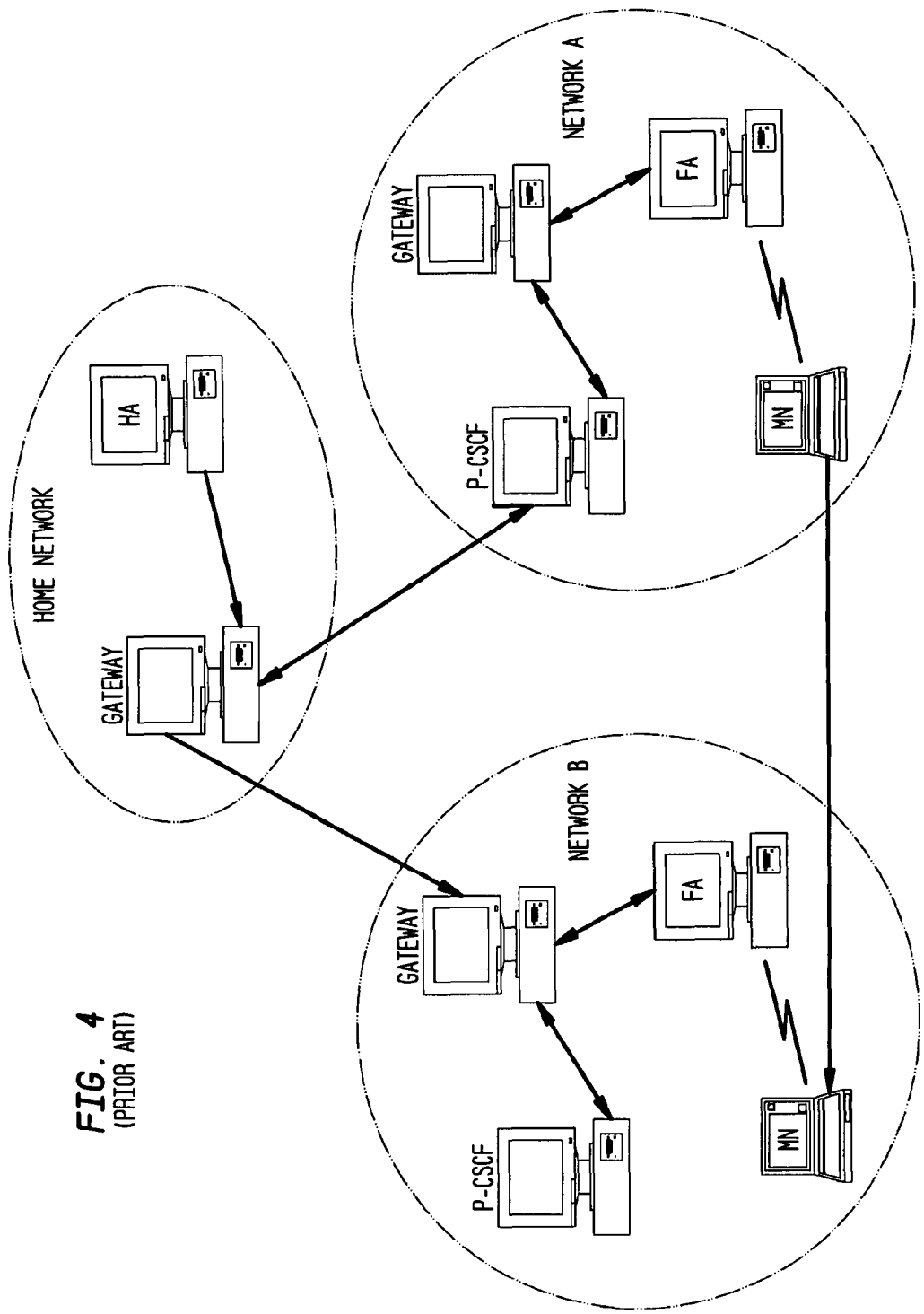
FIG. 4 illustrates a Mobile Host movement from one FA to another in MIPv4.
Figure 5:
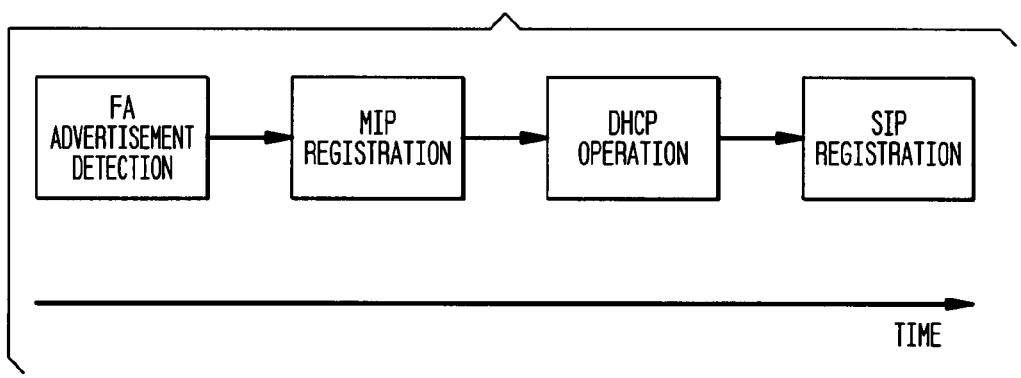
FIG. 5 illustrates a typical Handoff Operational Sequence.
Figure 6:
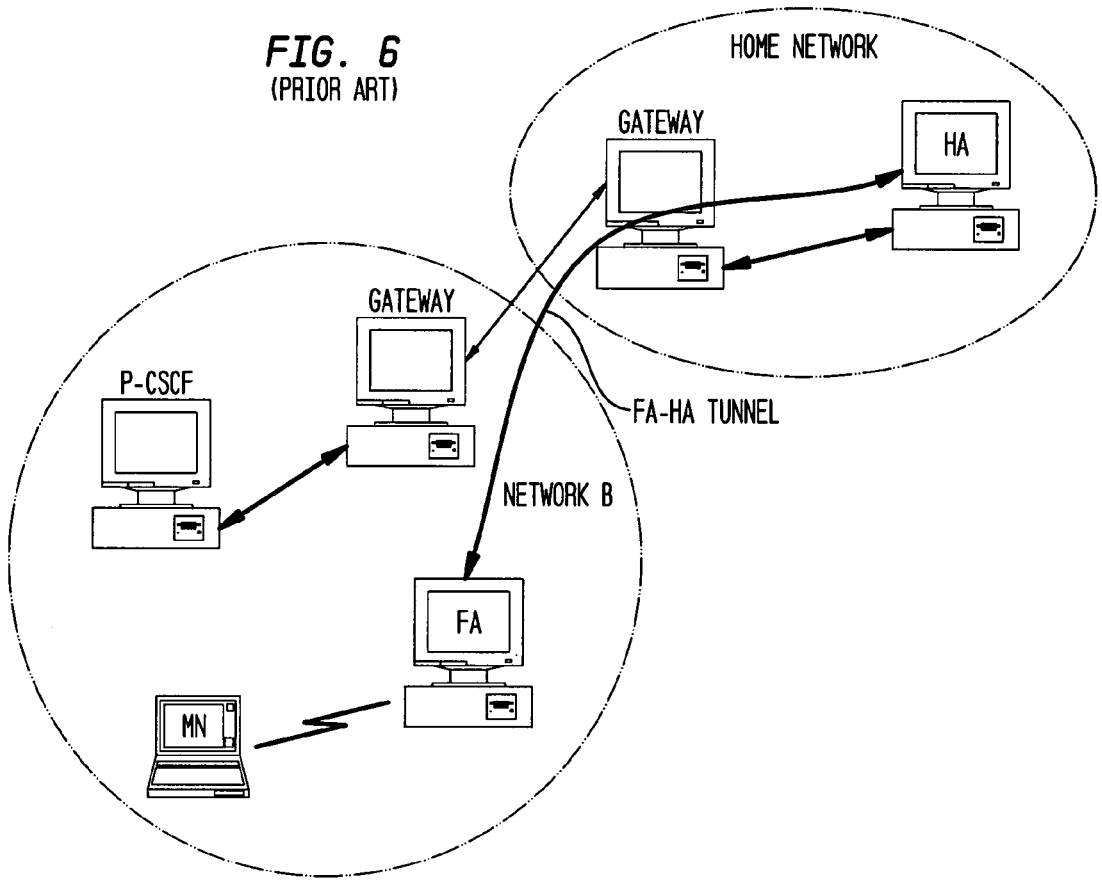
FIG. 6 illustrates a Trombone Routing Path between MN and P-CSCF.

In Column 2, Line 48, delete "FIG. 2a)," and insert -- FIG. 2a, --, therefor.

In Column 2, Line 53, delete "FIG. 2b)," and insert -- FIG. 2b, --, therefor.

In Column 5, Line 49, delete "SIR Registration;" and insert -- SIP Registration; --, therefor.

In Column 5, Line 51, delete "SIR INVITE;" and insert -- SIP INVITE; --, therefor.

In Column 9, Line 32, delete "FIG .12a)" and insert -- FIG. 12a --, therefor.

In Column 9, Line 37, delete "FIG. 12b)," and insert -- FIG. 12b, --, therefor.

Signed and Sealed this
Fourteenth Day of April, 2015

Michelle K. Lee
*Director of the United States Patent and Trademark Office*